Patented Aug. 1, 1939

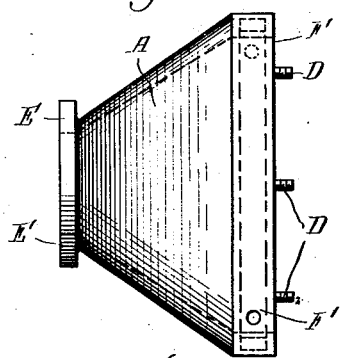
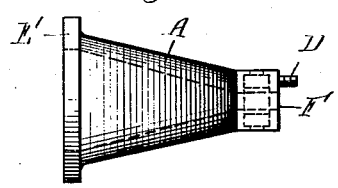
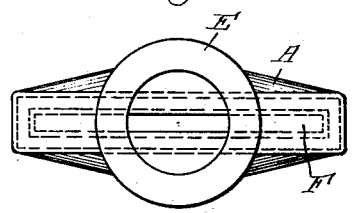
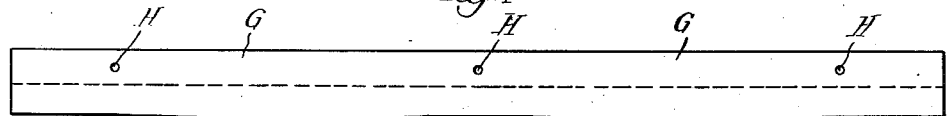
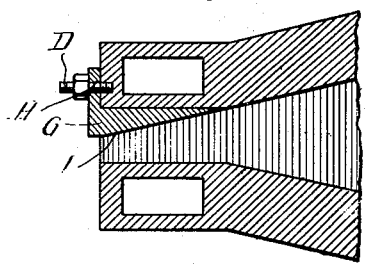

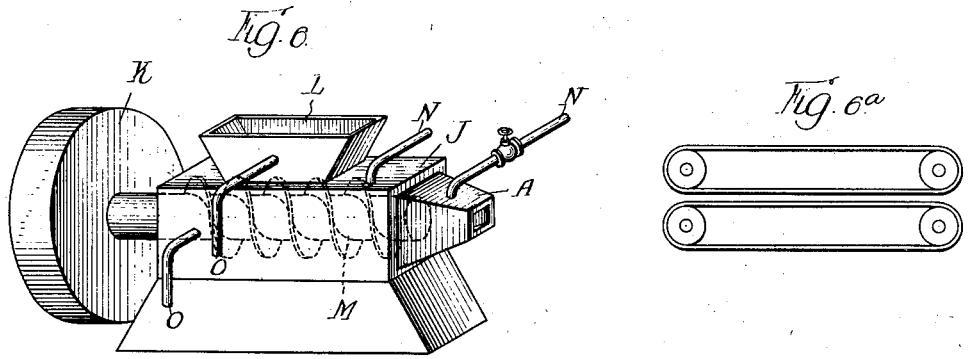
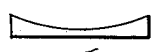
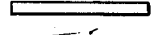
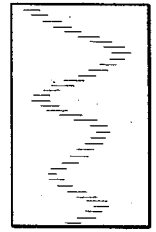
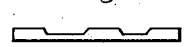
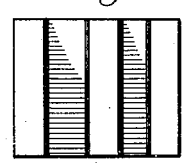
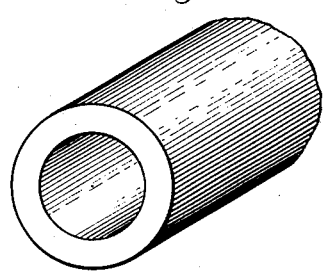
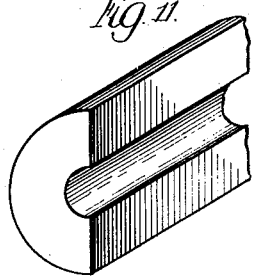
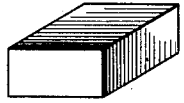
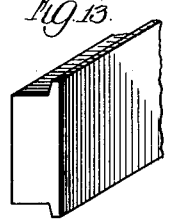
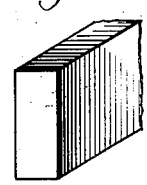
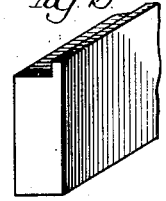

2,168,288

UNITED STATES PATENT OFFICE 2,168,288

EXTRUDING SHEET MATERIAL

Albert C. Fischer, Chicago, Ill., assignor to The Philip Carey Manufacturing Company, a corporation of Ohio Application December 12, 1927, Serial No. 239,566
Renewed April 17, 1935

6 Claims. (Cl. 18—55)

Extruding machines are known to the art. They are utilized in the manufacture of clay products, and are also utilized in the manufacture of asphaltic products. When utilized for extruding substances which are sticky they require heat, and both the body structure and the die heads thru which the material is extruded are often steam-heated. In other words, the shaft bearing the auger is also steam-heated.

My invention relates to the pressing of materials thru an extruder, and relates to two processes, one process is the formation of sheet material in which the sheet material is extruded in irregular thickness and later passed thru pressure rolls so that the thick portion may fill in the thinner portions, forming a uniform sheet without breaks or holes therein. The second process relates to the extrusion of fibrous material treated with an emulsion containing bituminous material and an emulsifying agent in the shape of clay, soap, resin soap, in fact any suitable agent, and water.

Likewise I might use a liquid material in which fibrous material is incorporated, and where the pressure squeezes the surplus liquid from the material. This may be in the shape of paint or a thin liquid coating, or it may be other waterproofing material, as it may be in a flowable or plastic state. By plastic I mean material which when heated has a tendency to flow, or it may be plastic in the sense of a cement mixture. The binder coating may be a glue mixed with water in a heated or cold state, or an adhesive material, or it may be silicate of soda mixed with water.

In the second process when the auger performs its duty in pressing the surplus thru the die the surplus liquid will be pressed out of the material, and I, therefore, provide in the extrusion machine outlet pipes so that the surplus material can be drained off and again mixed with other material.

The material which is thus extruded can be first mixed in suitable mixers which may be steam-heated or not, as required, and the mixture then conveyed to the extruder. Where an extremely wet mixture is made, the surplus liquid may first be drained off and then the batch placed in the extruder, the pressure draining off additional liquid when pressing thru the die or nozzle.

In the first process I prefer to use heated, plastic material, which may be in a flowable or non-flowable condition, and in which the binder is preferably bituminous material of a high melting point asphalt. In either case I may form sheet material as herein described. On the other hand, in such processes which are new, or parts of this invention which are new, I do not wish to be limited to the formation of sheet material except wherein sheet material is so fabricated, but I may press out bricks, pressed blocks, rail filler, bridge planking, blocks, slabs, straight sheets, or any other suitable material.

Likewise I do not wish to be limited to the rolling process in conjunction therewith, as certain of these items need not be rolled after extrusion, but where the sheet material is formed in irregular thicknesses for the purpose of making a uniformly thick sheet it will be necessary to roll the material.

My preferred method is to utilize a waterproofed binder in the shape of bituminous material and mix therewith fibrous material, or utilize roofing scrap therewith, heating the same in a suitable steam-heated mixer and with as little cooling as possible introducing the mass into the extrusion machine, forcing the same thru the extrusion machine in the desired shape, and where reduced to sheet form with a uniform thickness rolling the sheet to the proper thickness with suitable pressure rolls. These pressure rolls may be belted, in which case it would be necessary to use dusting material, or the rolls may be properly treated with some non-adhering substance without being belted. The purpose is to make a sheet as wide as thirty-six inches and form the sheet with uniform edges and uniform center.

This invention is best understood by referring to the drawings, in which Figure 1 represents a die A, having a flange E for the purpose of fastening same onto the extruder, a nozzle F—F having fastened thereon anchor studs D—D for attaching angle inserts.

Figure 2 illustrates a die head A, having a flange E for the purpose of fastening onto an extrusion machine, an outlet F and anchor studs D—D for attaching angle inserts.

Figure 3 represents another view of this head showing the flange E, the outlet F, and the extruder head A.

Figure 4 illustrates the angle insert G furnished with stud holes H, and an elevated and depressed base I, for the purpose of forming the sheet in thicker dimensions at its edges and center.

Figure 5 illustrates the angle plate G having anchor studs D and stud holes H, the base of the plate being represented by I.

Figure 6 illustrates an extrusion machine having a head A, a body section J, a drive K, a feed box, either steam heated or otherwise, L, provided with an auger M, steam inlets N and water outlets O, the purpose of the water outlet being to take care of the surplus liquid squeezed from the material by the auger M.

Figure 6a represents pressing rolls thru which the sheet may be pressed after being extruded.

Figure 7 illustrates a sheet of uniform thickness produced by this method.

Figure 7a illustrates the sheet being formed by the extruder, and Figure 7b the uniformly reduced thickness after rolling.

Figure 8 illustrates a sheet of insulation of uniform thickness represented in Figure 7a. In this instance the sheet is of narrower form.

Figure 9 is a plan view illustrating another form of sheet irregular in thickness.

Figure 9a is an end view of the sheet in Figure 9.

Figure 10 illustrates a cross section of pipe covering which can be extruded in this manner.

Figure 11 illustrates a pipe extruded thru this process.

Figure 12 illustrates a block or brick extruded by this process.

Figures 13, 14 and 15 illustrate a cross-section of the extruded block.

My invention contemplates a plastic waterproof mixture, a plastic mixture of fibrous material and an emulsifying liquid, a plastic mixture of fibrous material and water, it being understood that the mixture comprising fibrous material and bitumen would preferably be a blown asphalt, or other plastic material.

The special features of my invention are (1) an extruder head die provided with steam heat, and an angle insert which shapes the flow of the material to various thicknesses, (2) pressing rolls, either belted or unbelted, which reduce the sheet so formed to a sheet of uniform thickness, free from broken edges and free from tears in the center of the sheet, (3) providing an extrusion machine which provides for surplus liquids pressed out of the mixture and its removal from the extruder, (4) extruding insulation and other materials, coated or otherwise treated with liquids, which when pressed will release some of the liquid and extrude the mixture in blocklike structures or in sheets comparatively free from liquid, (5) the extrusion of pipe coverings, rail fillers, blocks and sheets of varying thicknesses thru an extruder as described, without further reduction except as they may be cut in various lengths, (6) the method of forming sheet material having heavier center or edge portions, (7) reducing sheets having heavier center or edge portions to a uniform thickness of wider dimension than the extruded sheet.

The flow of the plastic material upon being extruded will resemble the thickness of the elevations and depressions shown in the angle plate. In order to prevent torn edges and holes in the center of so wide a sheet it is necessary to provide for thicker material along the edges and the center of the sheet. This sheet is then presented to pressure rolls and reduced to a thinner dimension, and in doing so the thicker parts of the sheet fill in the parts of the sheet which are of less thickness, and produce a uniform edge and center and a sheet of uniform thickness. The usual mechanical contrivances will be provided for the control of the feed of the plastic material, such as provision for keeping the plastic material in a heated state, provision in the shape of a control lever, or by utilizing a variable speed transmission, it being important to control the flow and passage between the rollers so that as little wrinkling or humping will occur as possible. A sheet can thus be formed without broken edges and without holes in the center. The sheet is produced from the extruder slightly thicker than the final sheet is required, and the best results can be obtained by pressing this sheet from ⅛ to ¼ of an inch, in the process relating to the utilization of fiber mixtures with emulsions as described in the second process.

This invention contemplates in the majority of cases the use of linear fibers, stiff individual fibers, fibrous material in the shape of granules or coarse particles, finely divided fibrous material, waterproofed clay, etc.

My invention contemplates a preponderant waterproofed binder where bitumen and other waterproofed materials of such nature are employed. Where emulsions are employed, naturally the waterproofed material if utilized for the binding purpose would not be in a preponderant quantity. However, where this material is used for insulation purposes, involving heat, it would be best to use such binders as silicate of soda, starchy binders, or other binders which would not be affected by heat, thus enabling them to readily distort the shape of the finally formed product. The process would work when fabricating either type of material, my preferred method being to manufacture construction materials according to this method having a preponderant binder.

I claim:

1. The method of making construction units which comprises extruding plastic material into a continuous sheet of irregular thickness transversely, and subjecting same to pressure means.

2. The method of making construction units which comprises forming plastic material into a continuous sheet of irregular thickness transversely, and subjecting same to pressure rolls.

3. The method of making construction units which comprises forming plastic material into a continuous sheet of irregular thickness transversely, and rolling same between endless conveyor belts.

4. The method of making construction units which comprises forming plastic material into a continuous strip having a longitudinal depression in one face to provide irregular transverse thickness, and pressing same to substantially uniform thickness.

5. The method of making construction units which comprises forming fiberized plastic material into a continuous sheet with faces of irregular transverse thickness, and smoothing the irregular surfaces.

6. The method of making construction units which comprises feeding plastic material to an extruding device, extruding the material into a continuous sheet of varying transverse thickness, and pressing said continuous sheet to uniform thickness.

ALBERT C. FISCHER.